(12) United States Patent
Clark

(10) Patent No.: US 6,873,664 B1
(45) Date of Patent: Mar. 29, 2005

(54) METHOD AND APPARATUS FOR DETECTING AN INTERLEAVED CODE

(75) Inventor: James M. Clark, Verona, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 759 days.

(21) Appl. No.: 09/711,155

(22) Filed: Nov. 13, 2000

Related U.S. Application Data

(60) Provisional application No. 60/164,945, filed on Nov. 12, 1999, and provisional application No. 60/164,944, filed on Nov. 12, 1999.

(51) Int. Cl.[7] .............................................. H03D 1/00
(52) U.S. Cl. ..................... 375/340; 375/148; 375/222; 375/141; 375/142; 375/152; 375/150; 370/335; 370/342; 370/332; 455/502
(58) Field of Search ................................ 375/340, 148, 375/222, 141, 142, 152, 150, 147, 130, 367; 370/335, 342, 332; 455/502

(56) References Cited

U.S. PATENT DOCUMENTS

| | | | | |
|---|---|---|---|---|
| 4,234,930 A | | 11/1980 | Campbell | |
| 4,529,963 A | | 7/1985 | Gutleber | |
| 4,534,055 A | | 8/1985 | Iinuma | |
| 4,549,303 A | | 10/1985 | Gutleber | |
| 4,727,570 A | | 2/1988 | Tarbouriech | |
| 5,216,691 A | * | 6/1993 | Kaufmann | 375/150 |
| 5,345,469 A | * | 9/1994 | Fulghum | 370/342 |
| 5,757,767 A | | 5/1998 | Zehavi | |
| 5,790,588 A | * | 8/1998 | Fukawa et al. | 375/148 |
| 5,872,810 A | * | 2/1999 | Philips et al. | 375/222 |
| 6,018,667 A | * | 1/2000 | Ghosh et al. | 455/502 |
| 6,167,037 A | * | 12/2000 | Higuchi et al. | 370/335 |
| 6,226,315 B1 | * | 5/2001 | Sriram et al. | 375/140 |
| 6,345,069 B1 | * | 2/2002 | Dabak et al. | 375/152 |
| 6,370,134 B1 | * | 4/2002 | Aramaki | 370/342 |
| 6,389,058 B1 | * | 5/2002 | Lee et al. | 375/141 |
| 6,574,205 B1 | * | 6/2003 | Sato | 370/335 |
| 6,590,881 B1 | * | 7/2003 | Wallace et al. | 370/332 |
| 6,625,200 B1 | * | 9/2003 | Dent | 375/142 |
| RE38,523 E | * | 6/2004 | Ozluturk | 375/367 |

OTHER PUBLICATIONS

Laurence B. Milstein et al.; Combinational Sequences for Spread Spectrum Communications; IEEE Transcations on Communications; Jul. 1997; pp. 691–696.*

(Continued)

Primary Examiner—Stephen Chin
Assistant Examiner—Sudhanshu C. Pathak
(74) Attorney, Agent, or Firm—Edell, Shapiro & Finnan, LLC

(57) ABSTRACT

A receiver that receives a long pseudonoise (PN) code signal composed of two shorter codes interleaved with one another, includes a correlator unit that correlates the received signal with one or more reference codes corresponding to the two interleaved codes, respectively, and generates correlation signals. The receiver also includes an even code detector coupled to the correlator unit, for detecting from the correlation signals one of the two shorter codes, and an odd code detector coupled to the correlator unit, for detecting from the correlation signals the short code that is not detected by the even detector. A delay unit is coupled to the even and odd code detectors, and delays the even or the odd correlation signals so as to align the correlation signals. The aligned signals are combined and evaluated by a merit function. If the combined signals exceed a threshold value the short codes are determined to be aligned, the phase of each code can be determined, and the phase of the longer code can be determined from the determined phases of the shorter codes. The receiver can detect two short PN codes that have been combined, such as by interleaving the short codes, to create a long PN code. Hence, the receiver can inexpensively detect the two short codes which allows the receiver to detect the long code with high gain.

29 Claims, 10 Drawing Sheets

OTHER PUBLICATIONS

K. Higuchi et al.; Fast Cell Search Algorithm in DS–CDMA Mobile Radio using Long Spreading Codes; IEEE Transcations on Communications; 1997; pp. 1430–1434.*

Spilker, Jr., J.J. "GPS Signal Structure and Performance Characteristics", pp. 29–54, Global Positioning System, The Institute of Navigation, vol. 1, 1980.

Glazer, B.G., "GPS Receiver Operation", pp. 81–86, Global Positioning System, The Institute of Navigation, vol. 1, 1980.

Winch, Robert G., Telecommunication Transmission System (Second Edition), Copyright 1998, 1993 by McGraw–Hill, pp. 128–135.

Ananda, M.P., et al., Satellite Navigation Systems, Autonomous Navigation of the Global Positioning System Satellites, McGraw–Hill Encyclopedia of Science and Technology, pp. 53–59, 1986.

Ananda, M.P. et al., Autonomous Navigation of the Global Positioning System Satellites, The AIAA Guidance and Control Conference, Aug. 20–22, 1984, pp. 1–11.

* cited by examiner

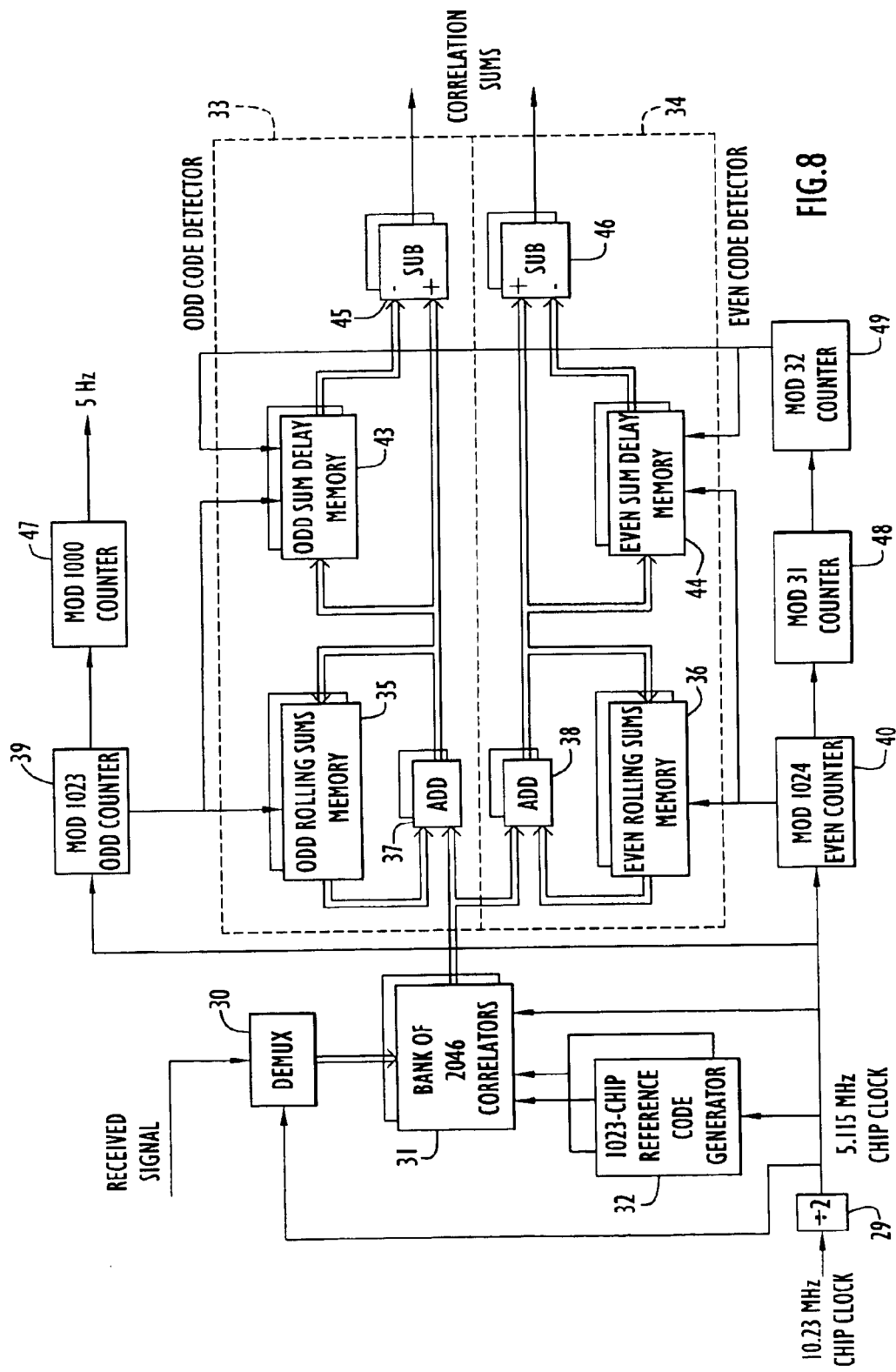

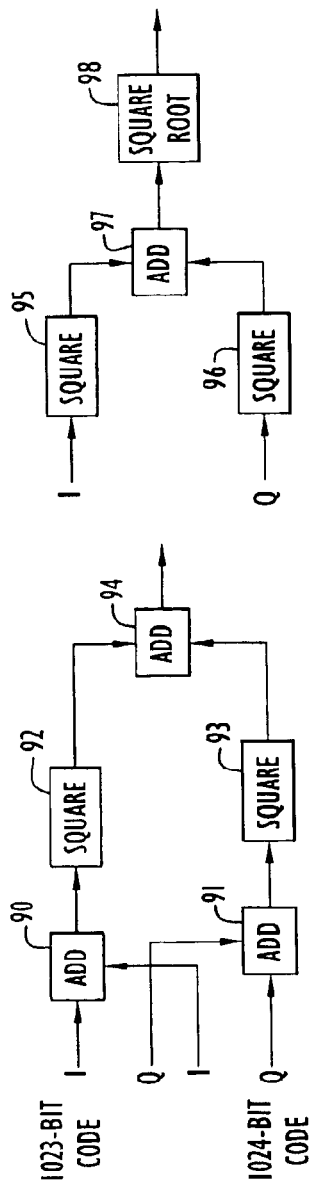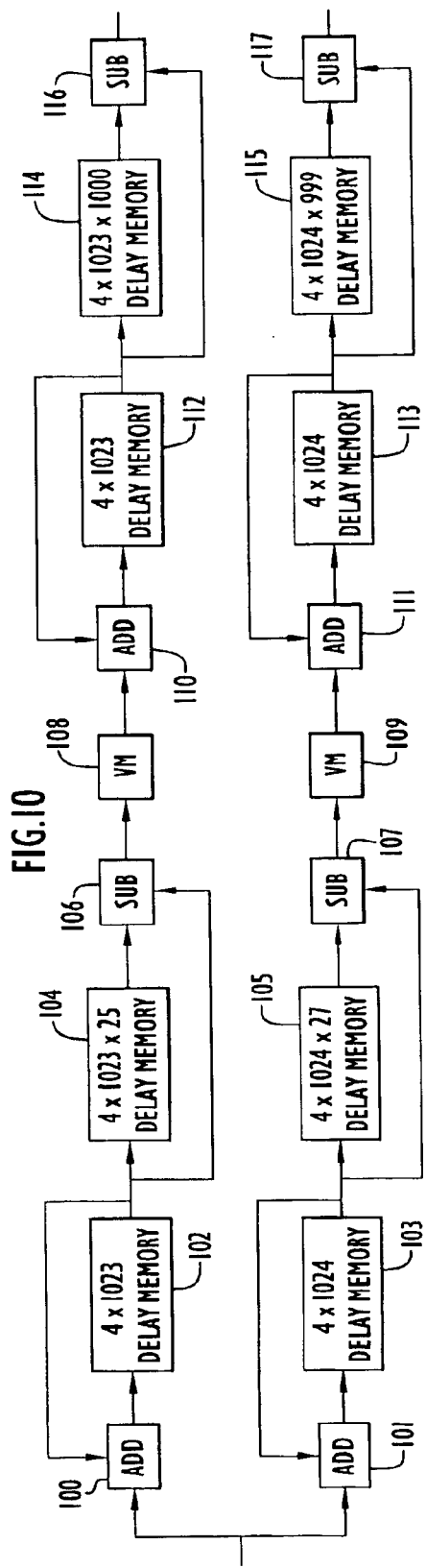

METHOD AND APPARATUS FOR DETECTING AN INTERLEAVED CODE

CROSS REFERENCE TO RELATED APPLICATION

This application claims priority from U.S. Provisional Patent Application Ser. Nos. 60/164,945, entitled "Interleaved Code Detection," and 60/164,944, entitled "Interleaved Code Structure," both filed Nov. 12, 1999. The disclosures of those provisional patent applications are incorporated herein by reference in their entirety.

BACKGROUND OF THE INVENTION

1. Field of the Invention

The present invention relates to digital data communications systems, and, more particularly, to a receiver and methods for detecting a coded signal.

2. Description of the Related Art

A pseudorandom code, also known as a pseudonoise or PN code, such as a maximum-length binary code (m-sequence) can be used to transmit timing information. The code can be sent repeatedly, in which case the timing is analogous to the ticking of a clock. This can be combined with other data (another code or signal) that effectively identifies each 'tick' as distinct from the others, and thus providing more complete time information such as the precise time of day.

The Global Positioning System (GPS) is a satellite based navigation system in which a GPS satellite transmits a signal with a long PN code, called the Precision (P) code. Generally, a high gain, and hence, a high tolerance to noise or jamming, can be achieved by using a long PN code in a spread-spectrum system. The P code, in addition to providing high gain, can be used by a GPS receiver to acquire timing information, and hence make ranging measurements that are used in determining the receiver's position. However, the P code is very long, repeating only once per week. Although the P code's period is that long a GPS receiver will have accurate knowledge of the portion of the P code pattern that the satellite is transmitting at any approximate time. However, the receiver's clock may be in error by as much as plus or minus five seconds before it receives and processes any GPS signals. Because the P code rate is 10,230,000 chips per second, and because the receiver must try code phases (timings) at half-chip intervals, there are 204,600,000 possible phases to try because of the time uncertainty range. The receiver tries to align and match a known code segment to the received signal, using a correlation function to evaluate the degree of matching. Because PN code have good autocorrelation properties they are widely used in such code matching systems such as GPS. If the codes match, then the receiver has detected the phase of the received code. Providing a clock more accurate than a few seconds in the receiver can be unduly burdensome, and typically will not be included in a receiver.

Another technique conventionally used, as in the GPS system, to detect a coded signal is to employ a second signal with a relatively short code to help acquire the signal with the longer code. The GPS system uses a second signal called the Coarse Acquisition (C/A) code signal. The C/A code has a period of about one millisecond, and therefore repeats often. The C/A code, because of its short repeat interval, does not provide enough information by itself to resolve the time uncertainty. However, it can help the receiver acquire the P code. Using the shorter C/A signal allows a GPS receiver to first detect that signal, which is relatively easy to detect or acquire because of its short code length and rapid repetition. After detecting the C/A code signal, the GPS receiver determines partial timing information from the C/A code signal. The receiver uses that partial timing information from the C/A code signal to reduce the number of code phases that need to be tested by correlation. Without the shorter C/A code signal to assist in narrowing the search for the P code, it would take a very long time for a receiver to acquire the longer P code signal.

Using an additional short-code signal to assist in acquiring a long-code signal requires a receiver to receive and detect two different signals having two different codes. Accordingly, the receiver must include the additional hardware and software to receive and detect two codes. The receiver will have increased concomitant costs and will require additional components and hence more space in order to acquire the two signals. Further, using two codes could take longer to acquire the long code than if only one signal were required to be received and acquired.

An example of a conventional spread-spectrum communications system is described next with reference to FIG. 1. In FIG. 1 a transmitter 1 and a receiver 9 are used in a spread-spectrum system such as the GPS system. The transmitter includes a PN code generator 2 that is controlled by a timing counter 3 and both are clocked by a clock oscillator 4. The PN code generated by generator 2 modulates a carrier signal via modulator 5 which is driven by carrier oscillator 6. Optionally, data can be superimposed onto the code and carrier by using a modulo 2 adder 7. The transmitter 1 transmits the modulated carrier via antenna 8 to a receiver 9. A second PN code generator, timing counter and clock oscillator can be used in the case where the transmitter transmits a second code, such as the C/A code in a GPS transmitter. Similarly, a receiver 9, described next, can include additional, similar components to handle the reception and detection of a second code, such as the C/A code.

Receiver 9 receives the transmitted signal via an antenna 10 that provides the received signal to a demodulator 11. The demodulator 11 is driven by a carrier oscillator 12, and produces two signals out-of-phase by 90°. Those signals are designated as in-phase (I) and quadrature phase (Q) signals. These two out-of-phase signals are provided to a group of parallel correlators 13. The parallel correlators can include as many correlators as the number of phases of the code to be tested. For example, if the code length is 1023 symbols, or chips, the parallel correlators 13 typically consist of 2046 correlators, one correlator for each code phase, at half-chip intervals. Multiple banks of the parallel correlators 13 can be used to correlate different signals, such as in this case where one bank correlates the I-signals and another bank correlates the Q-signals. The parallel correlators 13 are also provided with PN reference codes that correspond to the PN codes generated in the transmitter. PN code generator 14 generates the reference codes. The reference codes can be delayed to correspond to the various phases to be tested. Alternatively, the input signals, here the I and Q signals, can be delayed with various delays and correlated with a single PN code to test the different phases. The PN code generator 14 is driven by a local clock oscillator 15 and timing counters 16 which can effect the different timings for the PN reference codes. The local clock oscillator also drives timing counters 16.

The co-pending patent application entitled "Method and Apparatus for Generating an Interleaved Code," which is incorporated herein by reference, describes the generation and transmission of a long code that is composed of two interleaved shorter codes. The two codes can be combined to achieve the performance of a much longer code as described in that co-pending patent application. The combined code also has the attribute that the short codes can be individually detected and they can be used to determine the phase of the longer code. For example, two codes of about one thousand bits in one millisecond can be combined to make a composite code of two million bits in two seconds. This provides one code alignment every two seconds, and increases the noise tolerance two-thousand-fold, which may be necessary if a jamming signal is present on the communication links over which the coded signal is transmitted. The present invention is directed to methods and apparatuses for detecting such an interleaved code.

SUMMARY OF THE INVENTION

Therefore, in light of the above, and for other reasons that will become apparent when the invention is fully described, an object of the present invention is to detect a long code composed from two or more shorter codes.

A further object of the present invention is to detect a long code relatively quickly by detecting short codes used to compose the long code.

Yet a further object of the present invention is to detect a long code relatively inexpensively by detecting short codes used to compose the long code.

A still further object of the present invention is to achieve the performance of receiving a long code while detecting only short codes.

Another object of the present invention is to detect the phase of a long code composed of shorter codes and by using timing information from only those shorter codes.

Yet another object of the present invention is to detect a signal with increased noise tolerance.

Still another object of the present invention is to detect a signal with increased tolerance to a jamming signal.

It is a further object of the present invention to reduce the storage requirements for a receiver.

It is yet a further object of the present invention to reduce the number of correlators used in a receiver.

It is another object of the present invention to reduce the number of reference codes that must be generated in a receiver.

The aforesaid objects are achieved individually and in combination, and it is not intended that the present invention be construed as requiring two or more of the objects to be combined unless expressly required by the claims attached hereto.

In accordance with one aspect of the present invention, a long code composed from two shorter codes, is detected by the method that includes: a) detecting the two shorter codes; and b) based on the two detected shorter codes determining a phase of the long code. The long code can be composed of symbols of the two shorter codes that are interleaved with one another. If one of the shorter codes is n symbols long and the other one is m symbols long, m can be greater than or equal to n, and m and n preferably are mutually prime, and m can equal n+1. Preferably the two shorter codes are pseudonoise (PN) codes, and a sequence of n symbols of the code m symbols long is identical to the sequence of the code n symbols long.

According to another aspect of the invention, a long code composed from first and second codes interleaved with each other, is detected from a received signal in which the first code has a length of n symbols and the second code has a length of m symbols. The method includes a) demultiplexing the received signal into alternating symbol streams; b) correlating the first symbol stream with a first reference code to produce a sequence of first correlation signals, and correlating the second symbol stream with a second reference code to produce a sequence of second correlation signals; c) summing the sequence of first correlation signals over a first predetermined length to produce a first correlation sum, and summing the sequence of second correlation signals over a second predetermined length to produce a second correlation sum; and d) processing the first and second correlation sums to produce a signal indicative of the phase of the long code.

Part c) of the method includes adding a current first correlation signal x1 of the sequence of first correlation signals with a rolling sum stored at a current address of a first rolling sum memory thereby generating a first sum, storing the first sum in the first rolling sum memory at the current address, and incrementing the first rolling sum memory's address modulo n, and performing similar operations for a second group of correlation signals using a second rolling sum memory. The method further includes subtracting first and second sum delay values from the first and second sums, respectively, to generate first and second difference signals, wherein the first sum delay value corresponds to the (x1−n)th rolling sum and the second sum delay value corresponds to the (x2−m)th rolling sum. The first sum is stored in a first sum delay memory at a current address of the first sum delay memory, and then the first sum delay memory's address is incremented modulo n·m. The second sum is stored in a second sum delay memory at a current address of the second sum delay memory, and then the second sum delay memory's address is incremented modulo n—m.

One of the first and second difference signals is delayed by a predetermined delay, and first and second correlation sums are output. A merit function is applied to the first and second correlation sums, and the phases of the first and second short codes are determined based on the merit function. The phase of the long code is detected based on the phases of the first and second short codes.

In yet another aspect of the invention there is provided an apparatus that receives a signal having first and second codes interleaved with each other. The apparatus includes a correlator unit correlating the received signal with first and second reference codes corresponding to the first and second interleaved codes, respectively, and generating correlation signals. An even code detector coupled to the correlator unit detects from the correlation signals one of the first and second codes, and outputs an even code correlation signal. An odd code detector coupled to the correlator unit detects from the correlation signals one of the first and second codes not detected by the even detector and outputs an odd code correlation signal; and a processing unit processes the even and odd correlation signals to provide timing information.

The above and still further objects, features and advantages of the present invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

BRIEF DESCRIPTION OF THE DRAWINGS

FIG. 8 is a block diagram of the receiver shown in FIG. 2 showing the correlation unit, and even and odd detectors in greater detail and according to another example of the invention.

FIGS. 9A and B are block diagrams of circuits for converting vector correlation sums to scalar correlation sums.

FIG. 10 is a block diagram of another example of the receiver shown in FIG. 2 that uses scalar data.

DESCRIPTION OF THE PREFERRED EMBODIMENTS

Figure 1:
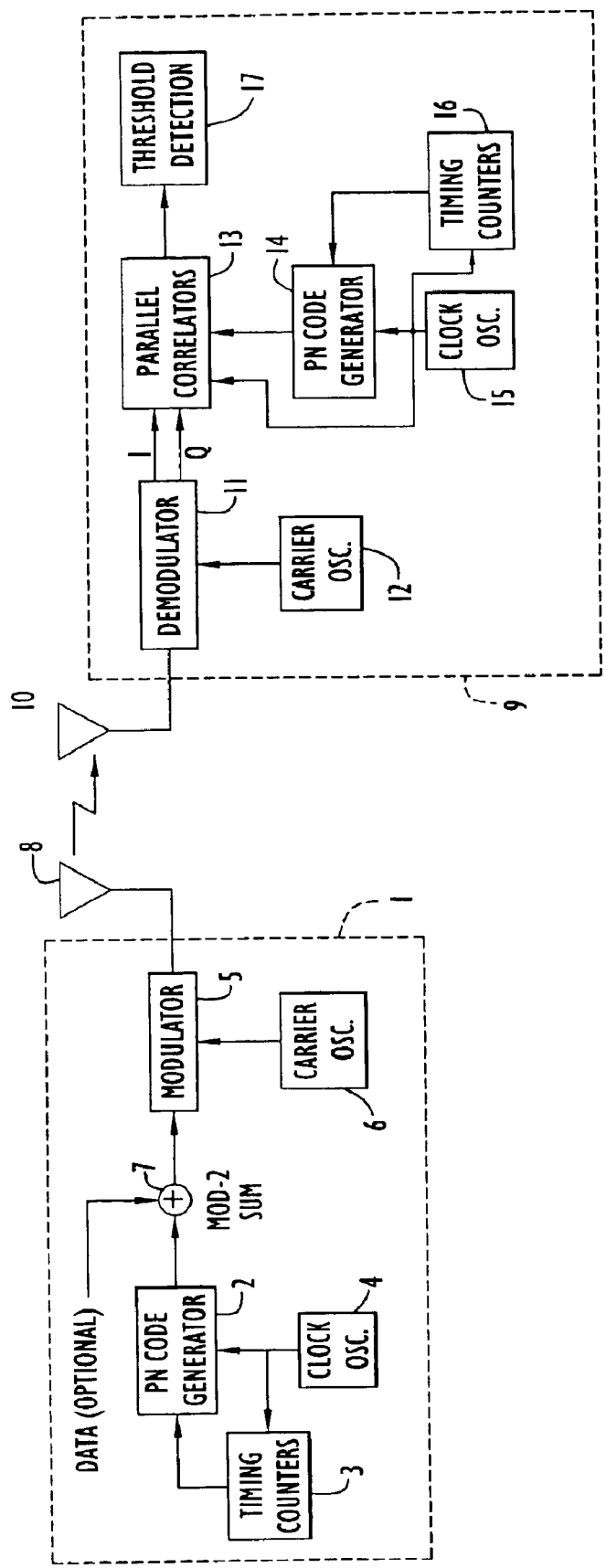
FIG. 1 is a block diagram of a conventional spread spectrum communication system.

Preferred embodiments according to the present invention are described below with reference to the above drawings, in which like reference numerals designate like components.

The embodiments of the invention described here detect a combination of two short codes. The two codes can be combined to achieve the performance of a much longer code as described in a co-pending patent application entitled "Method and Apparatus for Generating an Interleaved Code Structure," which is incorporated by reference herein. For example, two codes of about one thousand bits in one millisecond can be combined to make a composite code of two million bits in two seconds. This provides one code alignment every two seconds, and increases the noise tolerance two-thousand-fold, which may be necessary if an enemy is jamming the communication links over which the coded signal is transmitted.

Detection cost is generally proportional to the number of possible time (phase) alignments. It either costs hardware to test the alignments simultaneously, or costs time to test the alignments sequentially, or any combination of both. So detecting two interleaved short codes of lengths m and n has a cost proportional to $2 \cdot (m+n)$, whereas detecting a conventional code of equal length, and thus, of equal noise tolerance, has a cost proportional to $2 \cdot m \cdot n$, which is generally much greater. For example, if n=1000 and m=1001, the cost factor for the interleaved code is 4002 and the cost factor for the non-interleaved code is 2002000.

Not only does the longer code cost more, but in the transmission methods using two signals, both a long and short signal such as in the GPS system, the cost of detecting the short code must be added, although it may reduce the cost of detecting the long code.

Also, processing two kinds of signals requires two kinds of detection logic, and is a two-operation process with more opportunities to fail. Here, only one kind of signal is used, and both short codes are detected at the same time with similar logic.

The Interleaved Code Structure co-pending patent application describes a method of constructing a long pseudo-random code from one or two short pseudorandom codes, and a method of generating such a code in a transmitter. The present invention is directed to methods and apparatuses for detecting such codes, such as in a receiver.

Overview of Receiver

The receiver receives a signal in which at least two codes have been combined to form a longer code. The constituent codes are generally shorter than the longer composite code, and generally have lengths of m and n symbols, respectively. A symbol can be what is known as a "chip" or a "bit" Preferably, m and n are mutually prime, such as m=n+1, although the invention is not limited to such code lengths. In the examples discussed below, m=n+1, and the sequence of the second code, of length m, is identical to the sequence of the first code, of length n, except that an additional chip is added to the m-length code, thereby making the second code different only in length. Although some receivers require processing of I and Q samples, and receivers typically sample at twice the chip rate, for the purpose of simple illustration the examples described below only sample once per chip, unless otherwise noted.

In the examples discussed below the transmitter has interleaved an "odd" code that is 1023 bits long with an "even" code that is 1024 bits long. This produces a composite code that is $2 \cdot 1023 \cdot 1024 = 2,095,104$ bits long. Here, the symbol rate, or in this case the "chip" or "bit" rate is 10.23 MHZ. To get a convenient code period of exactly 0.2 seconds, the transmitter can remove 24,552 bits from each end of the composite code. This generates a code 2,046,000 bits long, and hence, has a period of 0.2 seconds. Using modular arithmetic, the odd code must start at bit 0, and the even code at bit 1000, so that the first bit pair of the truncated code will be pair 24,552 of the untruncated code. Here, all code positions are counted from zero. The invention is not limited to these codes of these lengths, and they are discussed here simply to illustrate various aspects of the invention.

Figure 2:
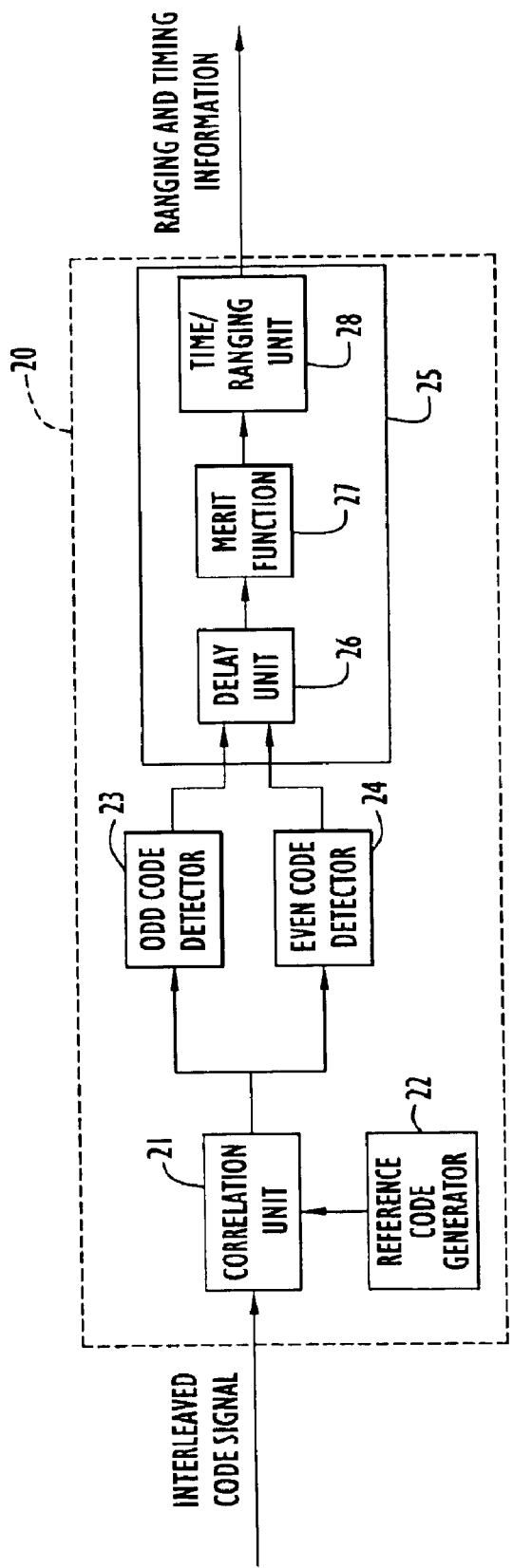
FIG. 2 is a block diagram of a receiver that detects a signal having an interleaved code, according to an example of the invention.

A block diagram of a receiver according to the invention is shown in FIG. 2. The receiver 20 receives an interleaved code signal and sends it to a correlation unit 21 that correlates the received signal with a reference code generated by reference code generator 22. The correlator unit here includes two groups or banks of correlators, one for each short code transmitted. Each group of correlators receives a reference code from the reference code generator 22, where the reference codes correspond to the two short codes used to generated the longer interleaved code. In this example, two reference codes are generated, one for each short code transmitted. Although, since the two short codes are identical except for a slight difference in length, one reference code generator that generates the 1023-chip short code can be used if the generator is controlled to account for the timing differences in the code due to the different code lengths. In this example, the reference code generator 22 generates a first reference code 1023 chips long (the odd reference code), and a second reference code 1024 chips long (the even reference code).

One correlator bank uses a 1023-chip cycle and outputs to the odd code detector. The other bank uses a 1024-chip cycle and outputs to the even code detector. The receiver's timing can de-interleave the received chips into "odd" and "even" data streams, but the de-interleaving can sometimes be wrong. The "odd" data streams may actually carry the even short code, and vice versa. Because of this, each bank of correlators processes both "odd" and "even" data streams, and this doubles the number of correlators needed. Each correlator in each of the banks of correlators detects a different phase of the short code. An analysis of the correlator outputs will determine, first, which one is the "odd" code and which is the "even" code (the interleave position), and second, the phase difference between these two codes at the time of the correlation. From this information, the time of the beginning of the longer composite code can be determined.

The receiver includes an odd code detector 23 and an even code detector 24, both of which receive the correlation signal outputs of the correlation unit 21. The odd code detector 23 may detect the odd code in position $P_{odd}$, one of 1023 phase positions in either the odd or even data. The even code detector 24 may detect the even code in position $P_{even}$, one of 1024 phase positions in either the odd or even data. That is, bit $P_{odd}$, of the odd code and bit $P_{even}$ of the even code are detected to be aligned in the same bit pair, which will be referred to here as the reference bit pair. If the de-interleaving is found to be reversed, the timing is adjusted. The receiver includes a processing unit 25 that determines the phase of the long code from the timing of the reference bit pair, and can calculate the time when the composite code began, using the well-known Chinese Remainder Theorem, as follows. First, $1024 \cdot P_{odd} - 1023 \cdot P_{even}$ is calculated. If this is negative, the processing unit adds the untruncated code length 2,095,104. It then subtracts the number of bits removed from the beginning of the code (i.e., 24,552) if the transmitted code has been truncated. The result is that the position of the reference bit pair from the beginning of the composite code is determined. The processing unit 25 includes a delay unit 26, that receives the correlation sums output from the even and odd code detectors 23 and 24, and delays one of those sums to align them. The delay unit 26 outputs the aligned sums to a merit function unit 27 that applies a merit function to the sums, and outputs a merit signal. A time/ranging unit 28 determines the phase of the long code (its time of arrival) according to timing of the aligned sums if the merit function exceeds a threshold. A time of arrival measured according to the receiver's timing is sometimes referred to as a pseudo-range.

Receiver Structure

Figure 3:
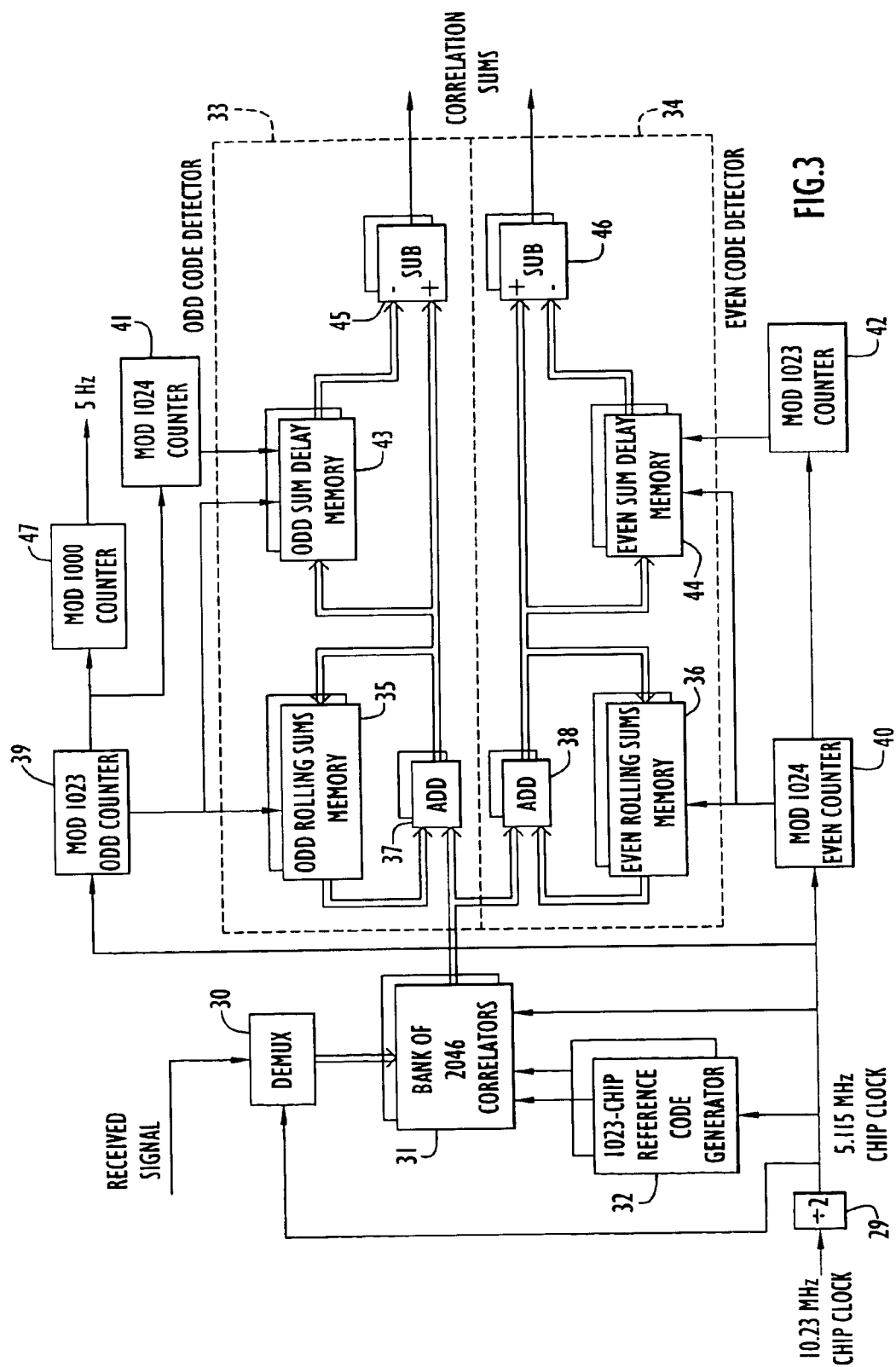
FIG. 3 is a block diagram of the receiver shown in FIG. 2 showing the correlation unit, and even and odd detectors in greater detail, according to one aspect of the invention.

A more detailed illustration of the receiving circuits, according to one aspect of the invention, is shown in FIG. 3, and the receiver structure is described below with reference to FIG. 3.

Sampling

A received signal is demultiplexed by a demultiplexer 30 into odd and even samples, with the even samples delayed by one clock, so that one odd sample and one even sample can be processed for each 5.115 MHZ clock pulse. Before the codes are detected, the receiver has not determined which samples correspond to the odd code and which correspond to the even code, so the odd/even labeling at this point is only arbitrary and tentative. FIG. 3 shows a generic demultiplexer and any circuit that divides the received signal into different sets of samples, sampled at the appropriate sample rate, can be used.

Correlation

Each of the two sets of samples output from the demultiplexer 30 is processed by one of the banks of correlators 31. Here, each bank includes 1023 correlators, one for each chip position in the 1023 code, and each position in the 1024 code except for one chip. The fact that one chip position out of 1024 is not correlated will be negligible as the correlation results are summed over the entire period of the long code. Alternatively, one of the banks of correlators could include m correlators while the other includes n correlators. Also, more correlators can be used if the signals are sampled at higher than the symbol rate.

The chip clock is has a rate of 10.23 MHz in this example. This chip clock is reduced to a 5.115 MHZ rate by a divide by 2 circuit 29. Reference code generators 32 are clocked at this 5.115 MHZ rate because that is the chip rate of each component code. In this example, two reference code generators 32 are used, one to generate a 1023 code, and another to generate a 1024 code.

Figure 4:
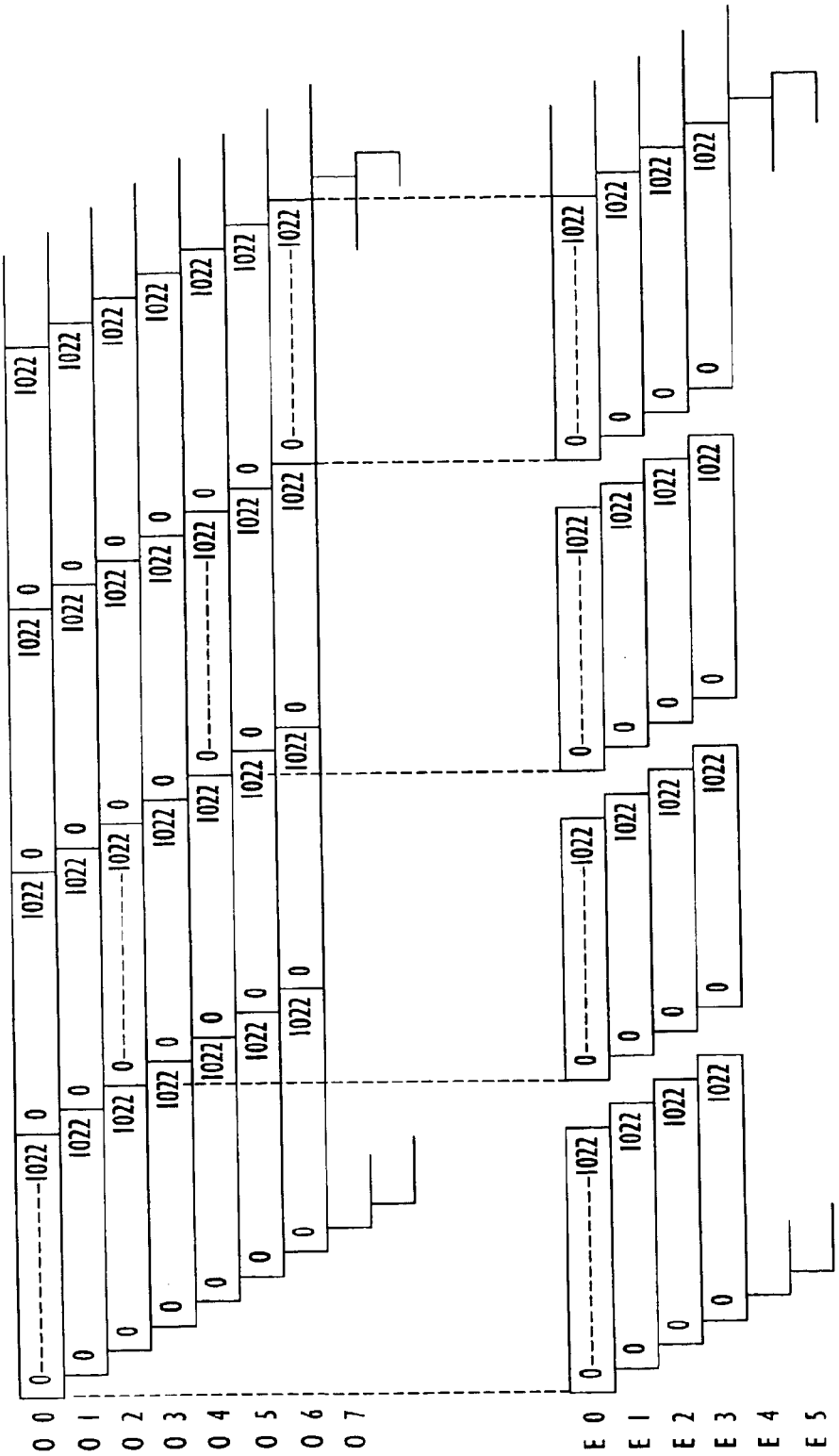
FIG. 4A depicts correlator timings of reference codes used in detecting a 1023-bit code.
FIG. 4B depicts correlator timings of reference codes used in detecting a 1024-bit code.

Because the even code (the 1024 code) is identical to the odd code (the 1023 code) except for the last chip, the even code will still correlate strongly with the 1023 chip reference code. Accordingly, a single 1023-chip reference code generator can be used to supply a reference code to both banks of correlators, with perhaps some memory to handle the timing of the code. FIGS. 4A and 4B show the delayed outputs in an embodiment using only a single reference code generator. In FIG. 4A the 1023 code is output with delays of 0, 1, 2, 3, . . . clock cycles, or chips, and these delayed odd code sequences are labeled O0, O1, O2, etc. The reference code generator 32 outputs the 1023 chip code, with chips labeled in the figure as 1 through 1022. The reference code generator 32 supplies one of the banks of correlators with successive sequences of the 1023 chip code as shown in FIG. 4A. In this alternative embodiment, in which only a single reference code generator is used, the other bank of correlators is also supplied the same 1023 chip code, with the delayed sequences labeled E0, E1, E2, etc., as shown in FIG. 4B. However, the reference code generator here must control the timing of the output of the sequences supplied to the bank of even correlators so that successive sequences are delayed by one chip to correspond to the 1024 chip timing in the even code. Here, the 1023 code sequences shown in FIG. 4A dashed lines correspond to the 1024 code sequences shown in FIG. 4B with dashed lines, to illustrate that the same code generator can be used to generate both reference codes. This method allows a single reference code generator be used to supply reference codes for two different codes.

Referring again to the embodiment shown in FIG. 3, the reference codes are delayed by 0, 1, 2 . . . . 1022 clocks for the 1023-chip reference code, and by 0, 1, 2 . . . 1023 clocks for the 1024-chip reference code. These delayed reference code signals are supplied to the correlators 31. Accordingly, each correlator within a bank of correlators is supplied with one of the delayed reference code signals, and hence, each correlator corresponds to a specific delay.

In other words, each delayed reference code signal is correlated, in one of the banks of correlators, with the odd signal samples. In the other bank of correlators each delayed reference code signal is correlated with the even signal samples. Each correlator is dumped (the sum output) and reset when the corresponding delayed reference signal reaches the end of its reference code (i.e., every 0.2 msec, approximately). Because of the delays, two correlators, one from each bank, are dumped at each 5.115 MHZ clock pulse. A modulo 1023 counter 39 is synchronized to the reference code generator 32, and indicates which pair of correlators is currently being dumped (also referred to here as the correlator position, or the phase position). These correlators in the two banks detect both 1023-chip and 1024-chip codes, because the codes are nearly identical.

The detected 1023-chip correlator position can be labeled as "odd" and taken as a reference position since its strong correlation signal will constantly appear at the same time delay. The detected 1024-chip correlator positions will then be "even" and rotating in a "lag" direction as discussed above. The current "even" position relative to the reference "odd" position will at any time indicate the current place in the 0.2 second code period, with the actual dump timing providing time resolution to within one 10.23 MHZ cycle. In effect the pair of "odd" and "even" positions determine the phases of the two shorter codes, and hence, determine the phase of the long code.

Code Detectors

Each of the data paths shown by double-lined arrows in FIG. 3 represents two data items (one odd code data item, and one even code data item) for each 5.115 MHZ clock pulse. The receiver includes an odd code detector 33 and an even code detector 34. The odd code detector 33 at the top of the diagram detects the odd code (e.g., the 1023 code), and the even code detector 34 at the bottom of the diagram detects the even code (e.g., the 1024 code). Since the receiver has not determined which samples are actually even or odd when the code detectors receive the outputs of the correlators, each detector processes both odd and even samples.

Alternatively, the receiver can start with the odd code detector processing only the samples referred to here as the odd samples and the even code detector processing only the samples referred to here as even samples. If nothing is detected, the receiver can switch the data flow so that the odd code detector processes even samples and the even code detector processes odd samples. This alternative would reduce the cost of the memories and adders by one-half because each detector would only process one set of samples. However, this alternative would require twice as long to determine the correct odd/even labeling. It would also be more difficult to recover when the initial decision is wrong.

In yet another alternative, the two component codes can be completely different if the odd/even switch is made at the demultiplexer and two reference code generators are used, in which case each detector need only process one set of samples at the same time.

The odd code detector 33 and even code detector 34, according to one aspect of the invention, include an odd rolling sums memory 35 and an even rolling sums memory 36, respectively. Each rolling sum memory stores a rolling sum for each correlator in each bank of correlators. The rolling sums are produced by adding a correlator's current output with the corresponding rolling sum for that correlator stored in the rolling sum memory. Adder 37 performs this summing for the odd code detector 33, and adder 38 performs this summing for the even code detector 34. The odd rolling sums memory 35 is addressed according to a modulo 1023 count by modulo 1023 odd counter 39. The even rolling sums memory 36 is addressed according to a modulo 1024 count by modulo 1024 even counter 40.

A counter 41 counts modulo 1024 in response to an overflow output from modulo 1023 counter 39, and a counter 42 counts modulo 1023 in response to an overflow output from modulo 1024 counter 40. The current rolling sum output from adder 37 is stored in an odd sum delay memory 43 at an address based on the counts in modulo 1023 counter 39 and modulo 1024 counter 41. Similarly, the current rolling sum output from adder 38 is stored in an even sum delay memory 44 at an address based on the counts in modulo 1024 counter 40 and modulo 1023 counter 42. In the embodiment shown in FIG. 3, the sum delay memories 43 and 44 store all of the previous rolling sums generated in the odd and even code detectors, respectively, over the preceding long code period, e.g., over the preceding 0.2 seconds. However, the invention is not limited to storing all the previous rolling sums for a full period of the long code, and alternatively, only a subset of the rolling sums need to be stored in the sum delay memories.

A subtractor 45 subtracts from the current rolling sum the rolling sum stored in the odd sum delay memory 43 that is delayed by 0.2 seconds, and outputs a difference signal for the odd sample correlations. Similarly, a subtractor 46 subtracts from the current rolling sum the rolling sum stored in the even sum delay memory 44 that is delayed by 0.2 seconds, and outputs a difference signal for the even sample correlations.

Here, the rolling sums output from the sum delay memories 43 and 44 are the oldest rolling sums stored in those memories and have been delayed by the period of the long code, in this case 0.2 seconds. The size of the sum delay memories is chosen so that the oldest rolling sum stored in those memories corresponds to a delay of those sums equal to the period of the long code. Alternative methods and structures can be employed to output the rolling sum that is approximately one long code period old.

The difference signals output from the even and odd code detectors are supplied to the processing unit 25 shown in FIG. 2 for processing to determine the phase of the long code.

Code Period Summing

The code summing operations briefly described above will now be described in more detail. The correlators in each bank of correlators 31 correlate the delayed reference codes with the signal sampled according to one of the interleaved codes output from demultiplexer 30. The receiver can achieve a very large coding gain by summing the outputs of those two banks of correlators 31 over the 0.2 second long code period.

Considering first detecting the odd code, the receiver can individually sum each of its correlators' outputs using timing based on the odd code's length, and one of those sums will detect the odd code. That is, the correlation sum that represents a signal plus noise will tend to be larger than the other correlation sums that represent noise only. This is because only one of the delayed reference codes will closely match the odd code in the received signal, and hence, will correlate strongly with the incoming signal. The correlator performing that correlation will output a strong correlation signal compared to the other correlators. As the output of that correlator is summed over time, the sum will tend to grow as the correlator's output is summed over the entire 0.2 second long code period, because the odd code in the incoming signal will be delayed by a constant amount in each instance of the odd code throughout the long code. In contrast, the sums of the other correlator outputs will not grow since they represent noise only.

Considering now detecting the even code, the receiver can individually sum each of its correlators' outputs using timing based on the even code's length, and one of those sums will detect the even code. Here, a second reference code generator is employed that outputs delayed 1024 chip reference codes and a second correlation unit similar to the 1023-chip correlator unit, but having 1024 correlators is used. Accordingly, the process for detecting the even code is similar to the process for detecting the odd code as discussed above.

Alternatively, the 1023-chip correlators can be used to correlate the 1024-chip code, because the even code too will correlate strongly with the 1023-chip reference code, since in this instance the even code is identical to the odd code except the odd code includes one additional chip. However, the resulting correlation signal will drift over time. Because the even code is interleaved with the odd code, and is one chip longer than the number of correlators used, each successive repetition of the even code in the received signal will strongly correlate with the 1023-chip reference code one chip later than does the previous instance of the even code. In contrast to the odd code correlation, which will produce a strong correlation at a constant delay position, the even code correlation will produce a strong correlation signal that will appear to drift or lag the previous correlation by one chip. Accordingly, an equal number of additional sums can be formed by rotating the correlators' signals one position, or chip, per dump period in the lag direction, and one of these sums will detect the "even" code. Rotating the correlators, in the lag direction is necessary because the 1024-chip code, i.e., the even code, is correlated with the 1023-chip correlators, so that successive correlators output a strong correlation signal each time the even code is correlated.

This raises the question: how does the receiver know when to start and end these summations, before it discovers the phase of the code period? This decision can be postponed by using what is referred to here as "rolling sums." Storage for the rolling sum, according to this aspect of the invention, must be at least one bit longer than is needed for storing the greatest actual sum. The rolling sum accumulates a correlator's output, and is allowed to overflow. In FIG. 3 the rolling sum memories 35 and 36 each can include two memories, one for each bank of correlators 31. A rolling sum is stored in each rolling sum memory of memories 35 and 36, for each correlator in the bank of correlators. Accordingly, each rolling sum memory in memory 35 has 1023 locations for storing rolling sums for the correlators in the correlators unit 31, in this example.

The receiver shown in FIG. 3 also stores each of the odd and even rolling sums in sum delay memories 43 and 44, respectively. Each of those sum delay memories includes two memories, one corresponding to each of the two banks of correlators 31. Alternatively, the receiver can sample each rolling sum periodically, and store the sampled rolling sums in the sum delay memories. The sum delay memories remember the previous rolling sums, e.g., 1, 2, 3 . . . samples earlier, up to 0.2 second earlier. Each time that the receiver samples the rolling sum it subtracts the 0.2 second earlier sum stored in the sum delay memory from the current sum to determine the actual sum for the most recent 0.2 second code period.

The receiver can ignore any overflow in calculating the rolling sum because the binary arithmetic operations that are employed operate with a modulus (a power of two) that is larger than the actual sum. This means that an extra bit is needed at the most-significant end of the storage memory. Accordingly, the current rolling sum is modulo subtracted from the oldest rolling sum stored in the sum delay memory.

The result is the change in the correlation power for a specific code phase measured over the length of the long code, e.g. 0.2 seconds.

Rolling Sum Computation

The method for computing a rolling sum, according to one aspect of the invention, will now be described in detail.

The odd code detector 33 computes rolling sums as follows. Each location in rolling sum memory 35 stores an odd rolling sum and an even rolling sum. The modulo 1023 counter 39 addresses memory odd rolling sum memory 35. When the count in the mod 1203 odd counter 35 equals v, the odd correlator in position v of correlator unit 31 is dumped, and the correlation value output is added to the odd rolling sum read from location v of memory 35. A new rolling sum is then written to the same location of memory 35, replacing the old sum. In a similar manner, the even correlation value from correlator position v is added to the even rolling sum at location v of memory 35. The 2046 rolling sums in memory 35 are never reset, but rather they are allowed to overflow, as discussed above.

The even code detector 34 computes rolling sums in a similar manner, but uses modulo 1024 even counter 40 to address even rolling sum memory 36. But since the modulus of counter 40 is 1024, which is one more than the number of correlator positions (i.e., 1023), these rolling sums will be rotated with respect to the even rolling sums. These sums are aligned with the timing of the 1024-bit codes, but since each correlation processes 1023 bits, the last bit of the "even" code is skipped.

Sum Sampling Timing

A modulo 1024 counter 41 counts in response to the output of modulo 1023 counter 39. Accordingly, the 1024 counter 41 and modulo 1023 counter 39 in combination count to men, or 1024·1023=1,047,552. Each memory in the odd rolling sum memory 35 has 1023 storage locations and are addressed by counter values of the modulo 1023 counter 39. The odd rolling sum delay memory 43, in this example, has as many storage locations as rolling sums that are produced in one long code interval. The complete long code includes 1,047,552 chips, and the same number of rolling sums will be produced. Accordingly, each memory of the odd rolling sum delay memory 43 shown in FIG. 3 has 1,047,552 locations, and is addressed by values of both the modulo 1023 counter 39 and modulo 1024 counter 41.

Alternatively, if the long code is truncated, such as to have a period of 0.2 seconds, a fewer number of rolling sums will be produced and the sum delay memories will require fewer memory locations.

Considering now the even code detector, a modulo 1024 counter 40 and a modulo 1023 counter 42 counts in response to the output of modulo 1024 counter 40. Accordingly, the 1024 counter 40 and modulo 1023 counter 42 in combination count to 1,047,552. Each memory in the even rolling sum memory 36 has 1023 storage locations and are addressed by counter values of the modulo 1024 counter 40. The even rolling sum delay memory 42 has the same number of storage locations as the odd rolling sum memory 43 discussed above.

Actual Sum Computation

The subtractors 45 and 46 subtract a prior rolling sum for a specific correlator from the current rolling sum for that correlator, and output correlation difference signals. The prior rolling sum is read out of a sum delay memory and is the rolling sum generated one long code period prior to the current rolling sum. The sum delay memory serves to delay the rolling sum by one long code period. Storing the prior rolling sums allows the code detectors to determine the difference between the current rolling sum and a prior rolling sum so that the change in the rolling sum can be determined over one long code period. By determining the change in a rolling sum over the period of the long code the code detectors do not need to begin and end correlation summations precisely when the long code begins and ends. Accordingly, the receiver can determine sum correlation values over a long code period without knowledge of the beginning and ending of the long code period, which is unknown when the sums are computed. This also allows the rolling sum memories to accumulate the sums without the need to keep track of the beginning and end of the long code periods.

Considering FIG. 3, in the odd code detector 33, the odd sum delay memory 43 is addressed by the counts from modulo 1023 counter 39 and modulo 1024 counter 41. Considering some time "t" when the odd rolling sum is produced by adder 37, that rolling sum is stored in odd sum delay memory 43 at the location addressed by counters 39 and 41. However, before the current rolling sum is written to that location in odd sum delay memory 43, the rolling sum already stored in that location is read and supplied to the subtractor 45. That earlier rolling sum read out of the odd sum delay memory 43 is the rolling sum for that same correlator that was produced one long code period earlier. This is so because, in this example, the size of the odd sum delay memory 43 is chosen to match the length of the long code's period.

The even code detector operates in the same manner, but the even sum delay memory 43 is addressed by the counts from the modulo 1024 counter 40 and modulo 1023 counter 42.

Alternatively, the sum delay memories 43 and 44 can be a different size, but controlled to read out the rolling sum that has been delayed approximately by the period of the long code.

The correlation difference signals output from subtractors 45 and 46 are supplied to the processing unit 25 to determine timing information about the long code as discussed in more detail below in under the heading Processing Unit.

Figure 5:
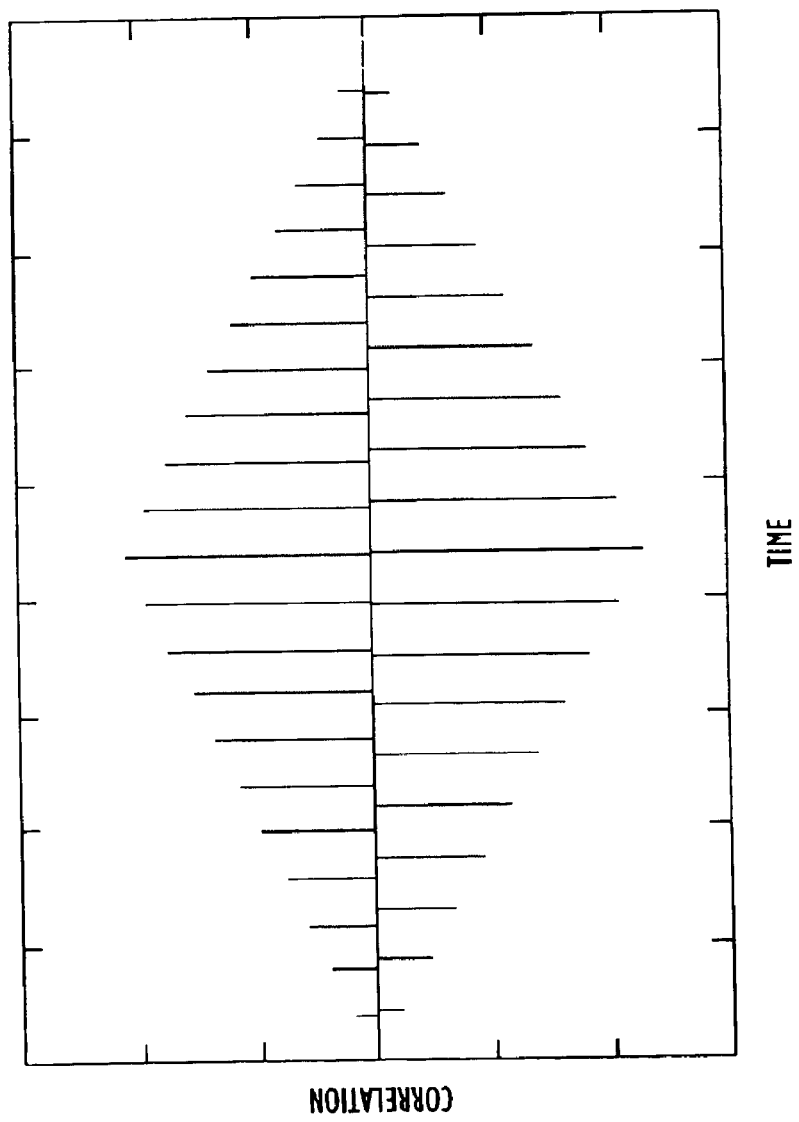
FIG. 5 is a graph showing odd and even correlations sums output from the odd and even code detectors shown in FIG. 3.

An example of correlation difference signals output from even and odd subtractors 45 and 46 is shown in FIG. 5. For ease of illustration, short codes of length 10 and 11 are considered. In FIG. 5 correlation difference signals for the odd code signal of length 11 are shown on the top of the figure, and correlation difference signals for the even code signal of length 10 are shown on the bottom of the figure, and for illustration purposes are shown inverted. In this example, the composite long code does not repeat, and results in a triangular shaped series of correlation difference signals.

Local Timing, and Arrival Time Calculation

A modulo 1000 counter 47 extends the counting of the modulo 1023 counter 39 to a period of 0.2 second, or to a frequency of 5 Hz. Additional counters can be added to count seconds, minutes, hours, etc. Accordingly, counters 39 and 47 form the beginning of a counter chain to define local time. If the count in modulo 1023 counter 39 is designated "OC" and the count in modulo 1000 counter 47 is designated "D," then together, counters 39 and 47 count the 10.23 MHZ clock pulses, where the clock count is CC=1023·D+OC modulo 1,023,000. Counters 39,40 and 47 are used to calculate the time of arrival of the even and odd codes when detected by the receiver. Using this timing information and knowing the phases of the short codes, the receiver can detect the phase of the composite long code, and determine the beginning of the long code using the method discussed above under the heading Overview of Receiver. When the receiver is able to make a sufficient number of such calculations that agree, the signal timing is reliably detected.

Processing Unit

The processing unit 25 shown in FIG. 2 includes a delay unit 26, a merit function unit 27 and can include a ranging unit 28.

The delay unit 26 receives the correlation difference signals from subtractors 45 and 46, and delays one of those signals by a predetermined amount in an attempt to align the even and odd correlation difference signals. The delay unit outputs the delayed correlation difference signal and the other correlation difference signal, collectively referred to here as the delayed correlation sums. The delay is necessary because the even and odd codes are interleaved in the received signal. Delaying one of the codes for one chip accounts for the interleaving timing. For example, the delay unit can delay the odd correlation difference signal by one chip in an attempt to align it with the even correlation difference signal.

By delaying the odd code by one chip will cause one pair of the correlation difference signals to align with one another. If the delayed correlation sums signals are combined, the correlation sums that are aligned will have a magnitude much larger than the sums that are not aligned. The merit function unit 27 combines the delayed correlation sums and applies a merit function to the combination to determine if a pair of sums meets a predetermined threshold.

Figure 6:
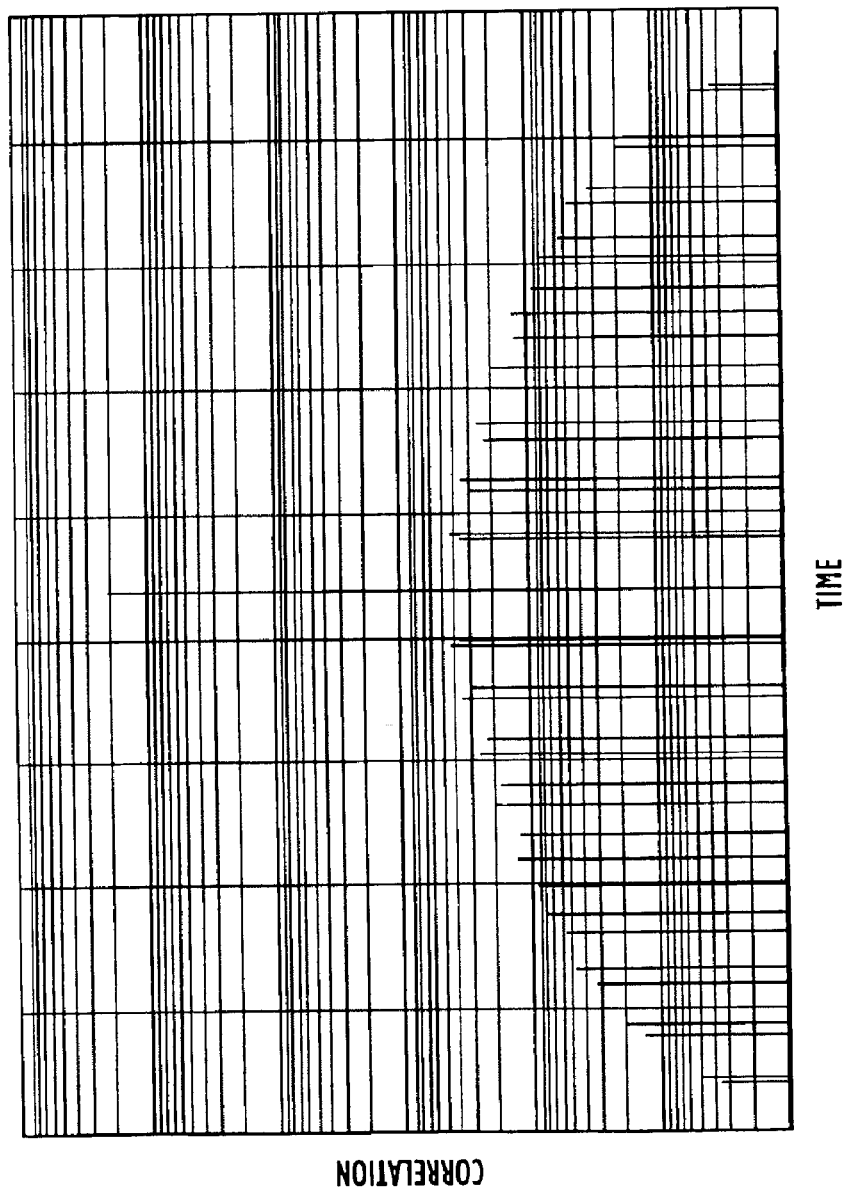
FIG. 6 is a graph showing the odd and even correlations sums of FIG. 5 delayed and combined.

The merit function unit 27 can combine and evaluate the delayed correlation sums using many different types of merit functions. Two examples are provided here, but it is understood that other types of merit functions can be used. In a first example, the merit function unit 27 multiplies the squares of the delayed correlation sums and determines if the product exceeds a predetermined threshold. FIG. 6 shows the result of applying this merit function to the correlation difference signals shown in FIG. 5. The product of the squares of the aligned pair of correlation sums will exceed the threshold because it will be the only pair of sums that are aligned. Since the other sums are not aligned they none of the sums alone, even if squared, will exceed the threshold. This is shown in FIG. 6, with the product of the squares of the aligned pair appearing in the center of the graph, with an amplitude that far exceeds the other correlation sums that are not aligned. The product of the squares of the correlation sums that exceeds the threshold will give the phase of the long code. Accordingly, the long code is then detected when one of the pairs of correlation sums, when the merit function is applied to it, exceeds the predetermined threshold.

Figure 7A:
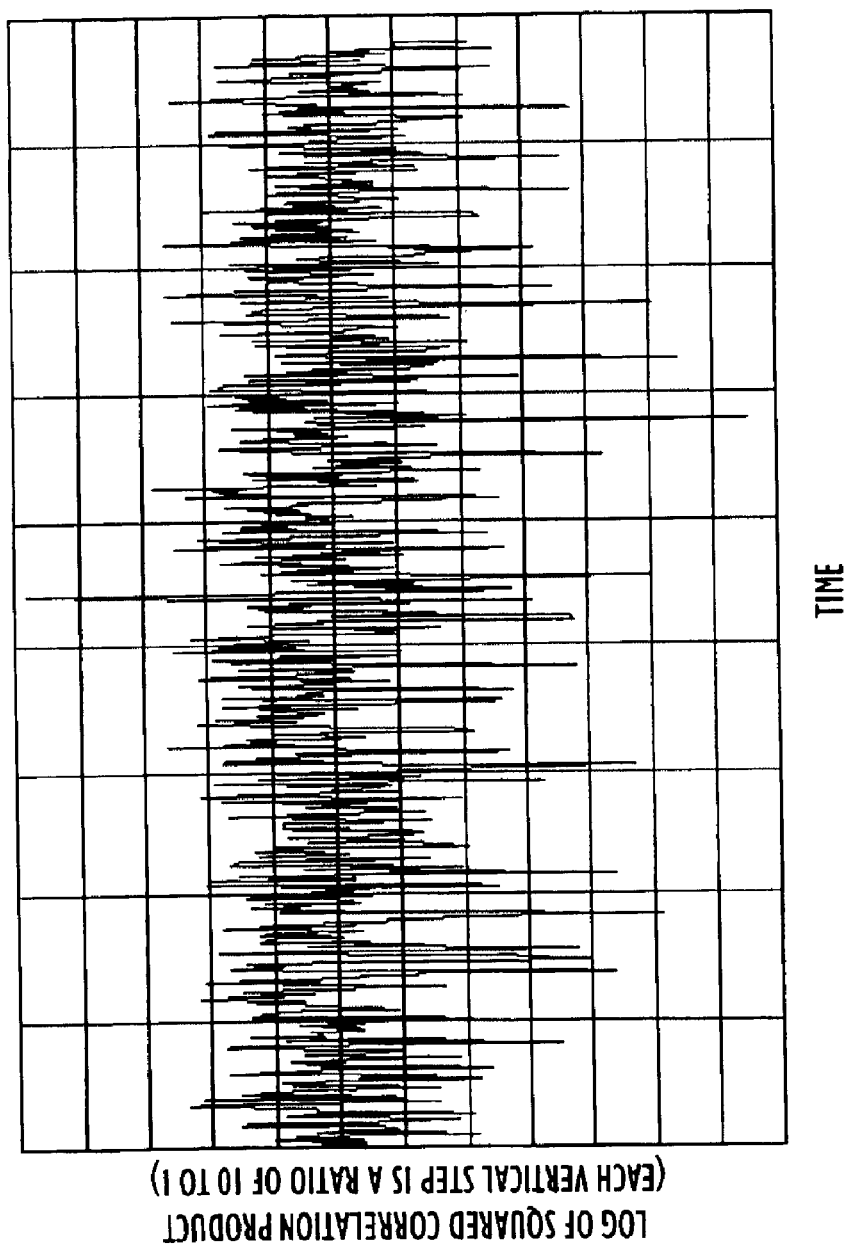
FIG. 7A is a graph showing an example merit function of combining the odd and even correlations sums, in the presence of noise, by taking the product of the squares of the sums.

FIG. 7A shows an example of taking the product of two squared outputs when noise is present. Again, the data point in the center of the graph has a value that far exceeds the other data point values, and hence, corresponds to the detected pair of correlation sums.

Figure 7B:
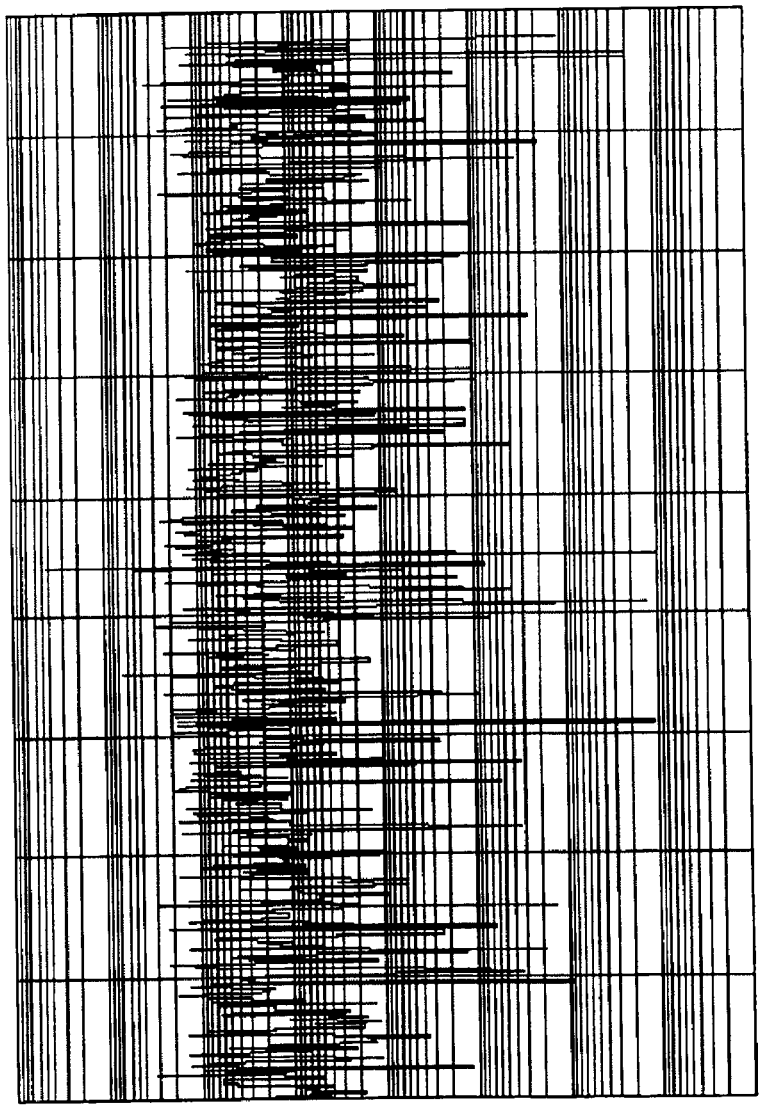
FIG. 7B is a graph showing an alternate merit function of combining the odd and even correlations sums, in the presence of noise, by taking the minimum of the square of the sums

Another example of the merit function is to take the minimum of the squared delayed correlation sums. FIG. 7B shows an example of this second exemplary merit function, applied to a signal where noise is present. Here, the data point in the center of the graph has a value that far exceeds the other data point values, and hence, corresponds to the detected pair of correlation sums.

Knowing the phases of the short codes, the Chinese Remainder Theorem can be applied to detect the beginning of the long code if it is desired to know that phase of the code. Depending on the strategy chosen, the calculation based on the Chinese Remainder Theorem might be done as part of the design process, or might be done in the receiver for each detection process.

If the receiver is designed to look for a pair of correlation sums with a fixed phase difference, preferably then the phase difference is known before the receiver is built, and the Chinese Remainder Theorem calculation, or an equivalent derivation, can be performed at the time the receiver is designed. That is, by design the start of the long code relative to the timing of the pair of correlation sums will be fixed. By delaying one of the correlation outputs with a predetermined fixed delay before processing the two outputs with a merit function, only correlation pairs having a corresponding fixed phase difference will be detected, and the pre-computed Chinese Remainder Theorem calculation will always apply.

Alternatively, the receiver can be designed to detect a pair of correlation sums with any phase difference, as opposed to a predetermined phase difference. For example, the receiver can be designed to first find a correlation sum that exceeds some threshold, then find another correlation sum from the other output that is greater than or equal to the first correlation sum, or perhaps that also exceeds the same threshold. The double threshold function can either perform the merit function, or it can be used as a preliminary test preceding a merit function. In either case, the receiver does not determine the phase difference until after the merit function produces a detection. This type of receiver must perform a Chinese Remainder Theorem calculation, or equivalent derivation, after each detection to interpret the result. In the case where the code lengths are n and n+1 symbols, this would proceed as discussed above. In the more general case where the codes have lengths of m and n symbols, every possible result can be pre-computed, and recorded in a table available to the receiver so it can look-up the long code phase for any given short code phase difference.

Alternatives

The example shown in FIG. 3 stores every rolling sum generated in sum delay memories 43 and 44, allowing for the difference correlation signals to very accurate reflect the sum of the correlations over the entire long code period. However, such accuracy is not always needed. It may be sufficient that when the merit function is applied to the correlation sums that the merit function value for the aligned pair of correlation sums exceed the value of all the other sums. Accordingly, not all the rolling sums need to be stored in the sum delay memories. Only enough rolling sums need to be stored so that a prior rolling sum that is computed relatively close in time to the rolling sum computed one long code period before the current rolling sum is available. The apparatus shown in FIG. 8 stores far fewer than all of the rolling sums that are generated during one long code period. It reduces the number of rolling sums stored, and hence, the required storage capacity of the sum delay memories thirty-one fold.

The cost saving alternative shown in FIG. 8 samples fewer than all the rolling sums and stores only those samples. FIG. 8 shows an apparatus that will accomplish this savings, by eliminating counters 41 and 42 and adding modulo 31 counter 48 and modulo 32 counter 49. As shown in FIG. 8, modulo 31 counter 48 counts in response to the modulo 1024 even counter 40, and modulo 32 counter 49 counts in response to the modulo 31 counter 48. The count values of modulo 32 counter 49 are supplied to the odd sum delay memory 43 and the even sum delay memory 44.

The modulo 31 counter 48 and modulo 32 counter 49 are used to control the sampling and delaying of the odd and even rolling sums for storing in the sum delay memories. The period of counter 49 is 1024·31·32=1,015,808 bit pairs, or 2,031,616 bits, or just 1.4 msec short of the 0.2 second code period. Each time counter 48 completes a cycle, the odd and even rolling sums are sampled for one cycle of modulo 1024 counter 40 so that each rolling sum is sampled once. The sample timing logic is not shown. The modulo 32 counter 49 is incremented for each such sampling interval, and there are 32 sampling intervals in nearly each code interval. The result of this sampling is that the sum delay memories are reduced in size thirty-one fold.

At some point at or prior to applying the merit function unit 27 applying merit function, the in-phase (I) and quadrature (Q) components of the correlation sums need to be combined. The correlation sum data are initially treated as vectors with I and Q components, and at some summing length called the predetection interval (PDI), are converted to scalar form. Ideally, the I and Q components of the 1023-chip and 1024-chip codes should be combined as shown in FIG. 9A. In FIG. 9A the I components of the 1023 and 1024-chip codes are supplied to adder 90 and the Q components of those codes are supplied; to adder 91. Each adder supplies a sum that is squared by squaring units 92 and 93. The squares are added by adder 94 to output a scalar value. However, combining the I and Q components as shown in FIG. 9A is not possible when the PDI is less than the code length. Instead, the even and odd code detectors 33 and 34 must each convert the vector sums to scalar sums as shown in FIG. 9B after forming the sums at the PDI length and before assembling those sums into code-length sums. In FIG. 9B the I and Q components are each squared by squaring units 95 and 96, and those squares are added together by adder 97. Optionally, the square-root of the sum is taken by square root unit 98, which outputs a scalar value.

The process of making increasingly longer sums is shown in FIG. 10, which shows an alternative system to the even and odd code detectors and counters shown in FIG. 3. The counters that provide addressing to the memories are not shown in FIG. 10 to simplify the diagram. The moduli of the counters corresponds to the memory sizes (i.e., the number of data samples) indicated in FIG. 10. The memory sizes also relate to the amount of delay, in this case in half-bits or half-chips, for data passing through the memory. In FIG. 10 each of the memory sizes has a factor of four because there are four data samples per chip pair. The top of FIG. 10 shows the odd code detector, and the bottom of the figure shows the even code detector. The components shown to the left of the vector magnitude (VM) units 108 and 109, process vector data, and the components to the right of the VM units process scalar data. The system shown in FIG. 10 operates in a similar manner to the system shown in FIG. 3, and although there are more memories in the system of FIG. 10, the memories are smaller because scalar data requires less storage space than vector data.

In FIG. 10 the banks of correlators shown in FIG. 3 sum the correlations for 1023-chip intervals, starting the intervals at all possible times, in this instance at half-chip increments. The components shown on the left side of FIG. 10, namely, adders 100 and 101, 4×1023 and 4×1024 delay memories 102 and 103, 4×1023×25 and 4×1024×27 delay memories 104 and 105, and subtractors 106 and 107, add 25 or 27 of these sums to make longer sums, for 25 repetitions of the 1023-chip code and for 27 repetitions of the 1024-chip code. In this example 25 and 27 repetitions correspond to the desired PDI. These numbers are used, because 25 is a factor of 1000 and 27 is a factor of 999. Other nearly-matching factors, such as those indicated in Table 1 below, also can be used.

TABLE 1

| Repetitions for the 1023-chip code | Repetitions for the 1024-chip code |
| --- | --- |
| 1 | 1 |
| 2, 4 | 3 |
| 8, 10 | 9 |
| 25 | 27 |
| 40 | 37 |
| 100, 125 | 111 |
| 250, 500 | 333 |
| 1000 | 999 |

The 25- and 27-repetition intervals also can start at all possible times. The VM units 108 and 109 convert the 25- and 27-repetition sums from vector form to scalar form, using the arrangement shown in FIG. 9B, either with or without using the square-root unit 98.

The adder 110, 4×1023 delay memory 112, 4×1023×1000 delay memory 114 and subtractor 116 operate to add 40 of the 25-repetition sums to generate sums for 1000 repetitions of the 1023-chip code. The adder 111, 4×1024 delay memory 113, 4×1024×999 delay memory 115 and subtractor 117 operate to add 37 of the 27-repetition sums to generate sums for 999 repetitions of the 1024-chip code. Again, the 1000- and 999-repetition intervals can start at all possible times. The delay unit 26 is adjusted to compensate for the different processing delays of the even and odd code detectors shown in FIG. 10.

Having described preferred embodiments of an interleaved code detector, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of detecting from a received signal a long code composed from first and second codes interleaved with each other, wherein the first code has a length of n symbols and the second code has a length of m symbols, the method comprising:

a) demultiplexing the received signal into alternating symbol streams;

b) correlating the first symbol stream with a first reference code to produce a sequence of first correlation signals, and correlating the second symbol stream with a second reference code to produce a sequence of second correlation signals;

c) summing the sequence of first correlation signals over a first predetermined length to produce a first correlation sum, and summing the sequence of second correlation signals over a second predetermined length to produce a second correlation sum; and d) processing the first and second correlation sums to produce a signal indicative of the phase of the long code, wherein c) includes c1) adding a current first correlation signal x1 of the sequence of first correlation signals with a rolling sum stored at a current address of a first rolling sum memory thereby generating a first sum, storing the first sum in the first rolling sum memory at the current address, and incrementing the first rolling sum memory=s address modulo n;

c2) adding a current second correlation signal x2 of the sequence of second correlation signals with a rolling sum stored at a current address of a second rolling sum memory thereby generating a second sum, storing the second sum in the second rolling sum memory at the current address, and incrementing the second rolling sum memory=s address modulo m;

c3) subtracting first and second sum delay values from the first and second sums, respectively, to generate first and second difference signals, wherein the first sum delay value corresponds to the (x1−n)th rolling sum and the second sum delay value corresponds to the (x2−m)th rolling sum;

c4) storing the first sum in a first sum delay memory at a current address of the first sum delay memory, and then incrementing the first sum delay memory=s address modulo n·m; and c5) storing the second sum in a second sum delay memory at a current address of the second sum delay memory, and then incrementing the second sum delay memory=s address modulo n·m.

2. The method of claim 1, wherein m and n are mutually prime.

3. The method of claim 2, wherein the first predetermined length is n symbols and the second predetermined length is m symbols.

4. The method of claim 3, wherein the first and second predetermined lengths are equal to n symbols.

5. The method of claim 1, wherein d) includes d1) delaying one of the first and second difference signals by a predetermined delay, and outputting first and second correlation sums;

d2) applying a merit function to the first and second correlation sums;

d3) determining the phases of the first and second short codes based on the merit function; and d4) detecting the phase of the long code based on the phases of the first and second short codes.

6. The method of claim 1, wherein d) includes d1) applying a merit function to the first and second correlation sums thereby generating first and second merit values;

d2) determining the phases of the first and second short codes based the first and second merit values; and d3) detecting the phase of the long code based on the phases of the first and second short codes.

7. The method of claim 5, wherein the merit function comprises taking the product of the squares of the first and second correlation sums.

8. The method of claim 5, wherein the merit function comprises taking the minimum of the squares of the first and second correlation sums.

9. The method of claim 5, wherein the predetermined delay is one symbol.

10. The method of claim 5, wherein in b) the first and second symbol streams are correlated with at least n instances of the first and second reference codes, respectively, each instance being delayed by a predetermined amount; and in d3) the phases of the first and second short codes are determined by identifying the amount of delay of the first and second reference codes that produces the sequence of correlation signals that results in first and second correlation sums that produce a merit function result in d2) that exceeds a threshold value.

11. The method of claim 5, further comprising determining a time of transmission of the received signal according to the detected phase of the long code.

12. The method of claim 5, comprising determining a range between a transmitter and a receiver that receives the received signal, according to the detected phase of the long code.

13. An apparatus receiving a signal having first and second codes interleaved with each other, the apparatus comprising:
 a correlator unit correlating the received signal with first and second reference codes corresponding to the first and second interleaved codes, respectively, and generating correlation signals;
 an even code detector coupled to the correlator unit, for detecting from the correlation signals one of the first and second codes, and outputting an even code correlation signal;
 an odd code detector coupled to the correlator unit, for detecting from the correlation signals one of the first and second codes not detected by the even detector and outputting an odd code correlation signal; and
 a processing unit for processing the even and odd correlation signals to provide timing information, wherein the processing unit includes a delay unit coupled to the even and odd code detectors, delaying at least one of the even and odd code correlation signals, and outputting a delayed correlation signal and an undelayed correlation signal, and a merit function unit coupled to the delay unit combining the delayed and undelayed correlation signals according to a merit function, and a timing unit coupled to the merit function unit for detecting a phase of the first code and a phase of a second code based on the combined correlation signals meeting a threshold value.

14. The apparatus of claim 13 wherein the length of the first code is n symbols and the length of the second code is m symbols, where m and n are mutually prime.

15. The apparatus of claim 14, wherein the second reference code is the same as the first reference code.

16. An apparatus receiving a signal having first and second codes interleaved with each other, the apparatus comprising:
 a correlator unit correlating the received signal with first and second reference codes corresponding to the first and second interleaved codes, respectively, and generating correlation signals;
 an even code detector coupled to the correlator unit, for detecting from the correlation signals one of the first and second codes, and outputting an even code correlation signal;
 an odd code detector coupled to the correlator unit, for detecting from the correlation signals one of the first and second codes not detected by the even detector and outputting an odd code correlation signal; and
 a processing unit for processing the even and odd correlation signals to provide timing information, wherein the processing unit includes a merit function unit coupled to the even and odd code detectors and applying a merit function to the even and odd correlation signals thereby generating even and odd merit values, and a timing unit coupled to the merit function unit for detecting a phase of the first code and a phase of a second code based on the even and odd merit values meeting a threshold value.

17. The apparatus of claim 16, wherein the timing unit determines, based on the detected phases of the even and odd codes, detects the phase of a long code formed from the interleaved first and second codes.

18. The apparatus of claim 13, wherein the merit function is the product of the squares of the delayed and undelayed correlation signals.

19. The apparatus of claim 13, wherein the merit function unit is the minimum of the squares of the delayed and undelayed correlation signals.

20. The apparatus of claim 13, wherein the timing unit determines, based on the combination of the delayed and undelayed correlation signals exceeding a threshold value, the phase of a long code formed from the interleaved first and second codes.

21. The apparatus of claim 20, further comprising a ranging unit for determining a range between the receiver and a transmitter of the first and second codes, based on the phase of the long code determined by the timing unit.

22. The apparatus of claim 20, wherein the correlator unit comprises at least two groups of correlators, the first group of correlators correlating symbols of the first code with a first reference code and the second group of correlators correlating symbols of the second code with a second reference code.

23. The apparatus of claim 13, wherein the even code detector comprises:
 an even code rolling sum storage unit storing a plurality of rolling sums, and outputting one of the rolling sums;
 an even code adder unit adding the rolling sum output from the even code rolling sum unit to a correlation signal generated by the correlation unit, and outputting a current even code rolling sum, wherein the even code rolling sum storage unit stores the current even code rolling sum;
 an even code sum delay storage unit outputting a prior even code rolling sum, and storing the current even code rolling sum; and
 an even code subtracting unit subtracting the prior even code rolling sum output from the even code sum delay storage unit from the current even code rolling sum, thereby producing an even code correlation sum signal.

24. The apparatus of claim 23, wherein the odd code detector comprises:
 an odd code rolling sum storage unit storing a plurality of rolling sums, and outputting one of the rolling sums;
 an odd code adder unit adding the rolling sum output from the odd code rolling sum unit to a correlation signal generated by the correlation unit, and outputting a current odd code rolling sum, wherein the odd code rolling sum storage unit stores the current odd code rolling sum;
 an odd code sum delay storage unit outputting a prior odd code rolling sum, and storing the current odd code rolling sum; and
 an odd code subtracting unit subtracting the prior odd code rolling sum output from the odd code sum delay storage unit from the current odd code rolling sum, and thereby producing an odd code correlation sum signal.

25. The apparatus of claim 24, wherein the odd and even rolling sum memories each store n and m rolling sums, respectively, and the odd and even delay memories store a multiple of n and m rolling sums, respectively.

26. The apparatus of claim 24, further comprising:
   a first even counter outputting a first even count to the even rolling sum storage unit and the even sum delay storage unit;
   a second even counter counting in response to an output of the first even counter and outputting a second even count to the even sum delay storage unit,
   wherein the even rolling sum storage unit outputs the even rolling sum from a location addressed by the first even count and stores the current rolling sum in the location addressed by the first even count, and the even sum delay storage unit outputs the prior even code rolling sum from a location addressed by the first and second even counters, and stores the current even code rolling sum in a location addressed by the first and second even counters.

27. The apparatus of claim 26, further comprising:
   a first odd counter outputting a first odd count to the odd rolling sum storage unit and the odd sum delay storage unit;
   a second odd counter counting in response to an output of the odd counter and outputting a second odd count to the odd sum delay storage unit,
   wherein the odd rolling sum storage unit outputs the odd rolling sum from a location addressed by the first odd count and stores the current rolling sum in the location addressed by the first odd count, and the odd sum delay storage unit outputs the prior odd code rolling sum from a location addressed by the first and second odd counters, and stores the current odd code rolling sum in a location addressed by the first and second odd counters.

28. The apparatus of claim 27, wherein the first even and the second odd counters are modulo m counters, and the second even and the first odd counters are modulo n counters.

29. The apparatus of claim 28, wherein the first even counter is a modulo m counter the first odd counter is a modulo n counter, and the second even and second odd counters both together comprise a modulo p counter and a modulo q counter, where p·q is substantially equal to n and the modulo q counter counts in response to the modulo p counter, wherein the even sum delay memory is addressed based on the first even counter and the modulo q counter, and the odd sum delay memory is addressed based on the first odd counter and the modulo q counter.

* * * * *